March 23, 1937.                R. J. BURKE                2,074,363
                            ASTRONOMICAL TOY
                  Original Filed May 17, 1933    3 Sheets-Sheet 1

INVENTOR
R. J. BURKE
BY
HIS ATTORNEY

March 23, 1937. R. J. BURKE 2,074,363
ASTRONOMICAL TOY
Original Filed May 17, 1933 3 Sheets-Sheet 2

March 23, 1937.  R. J. BURKE  2,074,363
ASTRONOMICAL TOY
Original Filed May 17, 1933  3 Sheets-Sheet 3
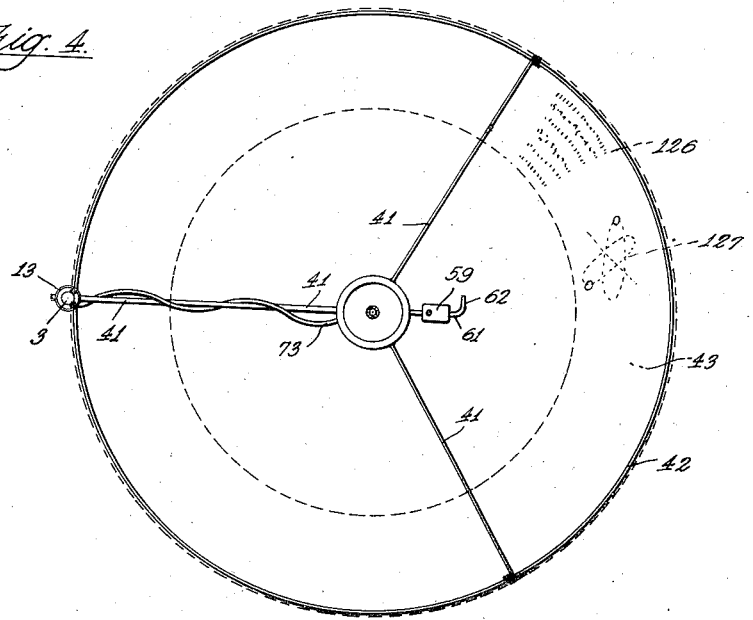
Fig. 4.
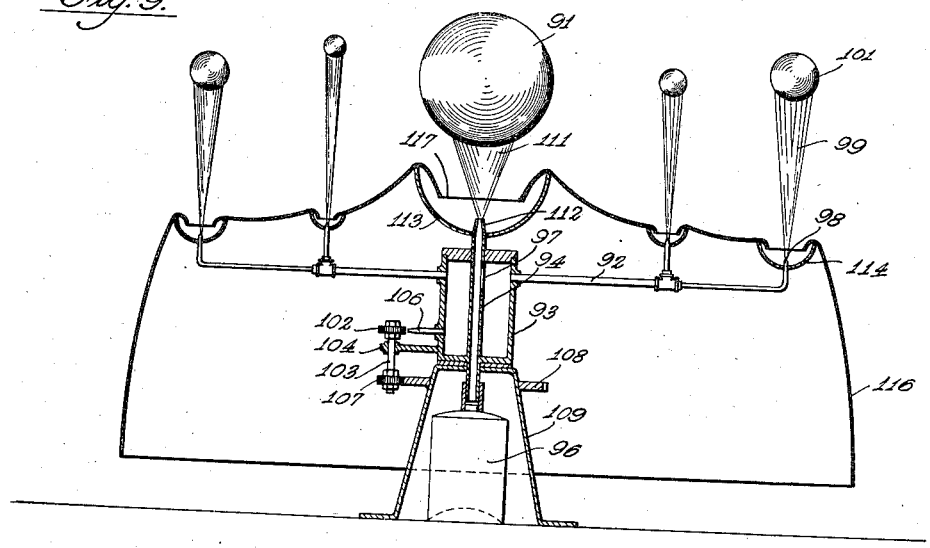
Fig. 9.
Fig. 8.
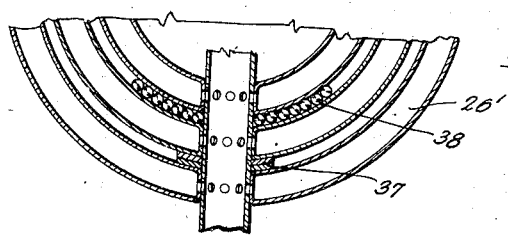
INVENTOR
R. J. BURKE
BY
Stuart W. N. Caule
HIS ATTORNEY Patented Mar. 23, 1937

2,074,363

UNITED STATES PATENT OFFICE 2,074,363

ASTRONOMICAL TOY

Richard J. Burke, Altadena, Calif.

Application May 17, 1933, Serial No. 671,487
Renewed January 2, 1937

22 Claims. (Cl. 35—45)

This invention relates to orreries, or planetaria, and has for an object the provision of a device falling under this general classification, inasmuch as it can be so arranged as to represent mechanically the relative positions and movements of the celestial objects constituting the solar system, and in this manner be of assistance in teaching to others and/or in acquiring a knowledge of the natural phenomena produced by planetary and other satellitious movements, such as solar and lunar eclipses, equinox, apogee and perigee, and the like.

It is also an object, moreover, to provide a device of this general character which is not limited to representation of members of the solar system, but which can be modified so as to enable it to simulate other celestial objects and/or groups of objects, such as constellations, multiple stars, and other astronomical phenomena occurring beyond the limits of the solar system.

The outstanding object of the present invention is to provide a device which is susceptible of embodiment as a piece of scientific or educational apparatus, or as a toy, through the use of which an especially vivid conception of the effect and influence of gravity on the celestial bodies can be acquired and taught.

A more detailed object in this connection is to provide a device of the general character indicated wherein a plurality of bodies each simulating a celestial object, such as a star, planet, satellite, or nebula, are supported in predetermined relative positions through the expedient of pneumatic means such as jets of air or other gas, with the result that an unusual degree of realism is imparted to the illusion presented by the device, for the reason that the several bodies are actually floating freely in the air without any visible means of support in apparent duplication of the manner in which the simulated celestial objects are retained in their respective relative positions by gravity.

A further object is so to arrange the nozzles directing the jets whereby the bodies are supported, that the bodies are grouped in a manner similar to the actual arrangement of the members of the constellation, planetary system or other celestial group of which the device is a simulation or model, with the result that the device assists in acquiring a knowledge of many astronomical facts, such, for example, as the relative size, spacing and arrangement of the members of any given constellation.

Another object is to provide a device of the general character described having incorporated therewith mechanical refinements whereby are attained simplicity and economy of construction, positiveness of operation, durability and dependability.

The invention possesses other objects and features of advantage, some of which, with the foregoing, will be set forth in the following description of the embodiments of my invention which are illustrated in the drawings accompanying and forming a part of the specification. It is to be understood that I do not limit myself to the showing made by the said drawings and description, as I may adopt variations of the embodiments of my invention as set forth in the claims.

Referring to the drawings:

Fig. 4 is an enlarged horizontal sectional view showing in plan one of the devices for supporting one of the bodies simulating a member of an astronomical group. The plane of section is indicated by the line 4—4 of Fig. 2 and the direction of view by the arrow.

Fig. 5 is an enlarged detail view in elevation, showing one of the simulating bodies and the nozzle associated therewith.

Fig. 6 is a view similar to Fig. 5, but showing another of the simulating bodies and the supporting nozzle associated therewith as well as an auxiliary body and the supporting means therefor.

Fig. 7 is an end elevation of a slightly modified form of supporting nozzle.

Fig. 8 is a detail view similar to Fig. 3, but showing a slightly modified form of central supporting means. Portions of the figure are broken away to reduce its size.

Fig. 9 is a view similar to Fig. 2, but showing a modified form of device embodying my invention.

Figure 1:
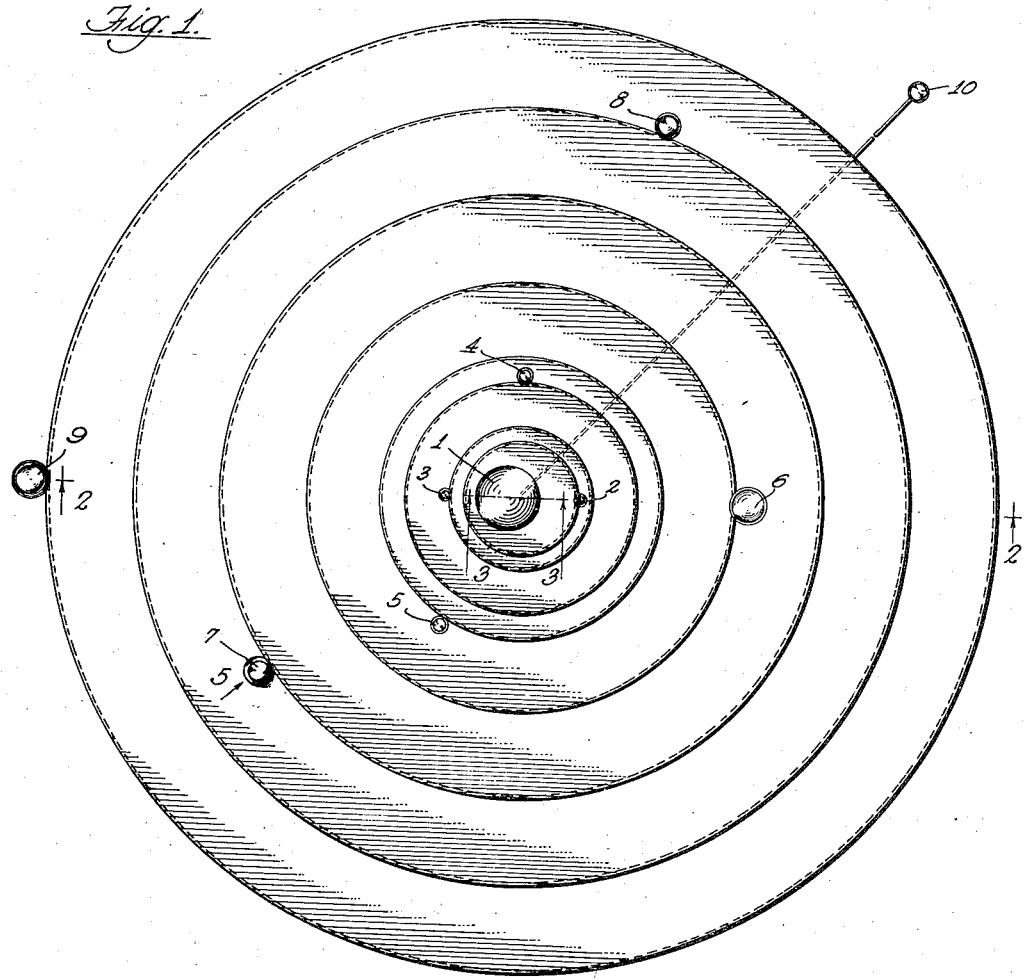
Figure 1 is a top plan view of a mechanism embodying the principles of the present invention.
Figure 2:
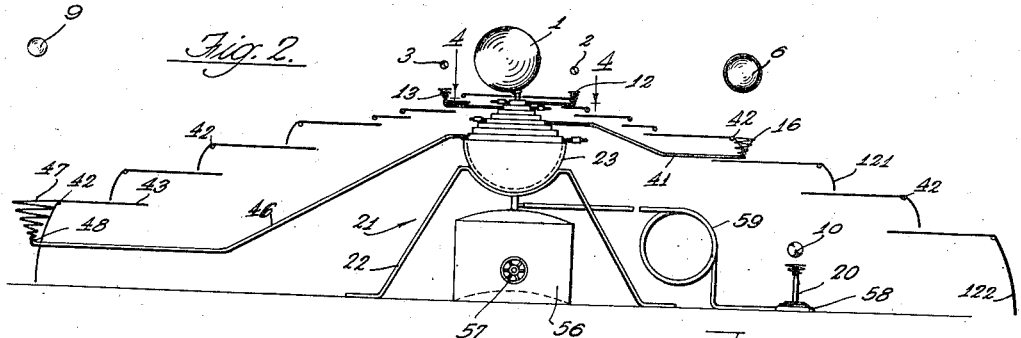
Fig. 2 is a transverse, vertical, medial sectional view, partially diagrammatic, taken upon the line 2—2 of Fig. 1, with the direction of view as indicated.

That embodiment of my invention which has been chosen for illustration is truly an orrery or planetarium, for the reason that it is a model of the solar system adapted to illustrate mechanically the relative sizes, positions and movements of the various members thereof. However, as will more fully be understood as the description of my invention progresses, the device is susceptible of modification so as to adapt it to reproduce in miniature other celestial bodies or groups of bodies. Referring particularly to Figs. 1 to 4 inclusive, the planetarium there illustrated comprises a group of bodies, preferably 10 in number, and identified by the reference numerals 1 to 10 inclusive, although it should be understood that the number of bodies included may be varied so as to meet any particular set of requirements. These bodies 1 to 10 respectively represent in miniature the Sun and the planets Mercury, Venus, Earth, Mars, Jupiter, Saturn, Uranus, Neptune and Pluto.

My invention resides in the novel method of supporting and moving the bodies 2 to 10 inclusive whereby an unusual degree of realism is imparted to the illusion which my device is capable of presenting and which makes it appear that the several bodies are actually sustained by a gravitational influence inasmuch as no visible means for supporting the bodies is employed. Each of the several bodies 2 to 10 inclusive is supported upon an upwardly directed jet of air or other gas. The direction of these jets is determined and controlled by suitable fluid-discharging means, such as nozzles 12 to 20 respectively, and each is preferably carried by a movable supporting structure whereby it can be moved independently of the others but in a predetermined orbit simulating the orbit traversed by the celestial object of which it is a model.

These supporting structures are all carried by a central base 21, preferably in the form of a bracket 22 supporting a bowl 23, through the bottom of which an axially disposed tube 24 extends vertically. For each of the bodies 2 to 9 inclusive a bowl or cup-shaped member 26 is rotatably mounted upon the tube 24; and these bowls are preferably of such design that they are adapted to nest one within the other, as clearly shown upon Fig. 3. Moreover, the lowermost cup 26 is adapted to fit nicely into the bowl 23. Each of the cups 26 is of hollow construction, i. e., it is composed of two spaced walls 27 joined at their upper or peripheral edges by a horizontal wall 28 adapted to hermetically seal the cup against the escape of gas therefrom. A tubular wall 29 is provided in each cup 26 at the axis thereof so as to mount the cup for rotation upon the tube 24, it being understood that the tube 24 extends through the tubular walls 29 of all of the cups 26. Each of these tubular walls 29 is provided with a series of ports 31 establishing communication between the inside of that cup 26 and a plurality of ports 32 which are formed in the wall of the tube 24 in position to register with the ports 31 of the cups, i. e., the ports 32 are arranged in a plurality of annular series, the number of which corresponds to the number of cups 26 employed and the spacing between each two series of ports 32 corresponds to the spacing between the ports 31 of each two adjacent cups. The result is that communication is established between the bore of the tube 24 and the respective interiors of all of the cups 26, so that gas supplied to the tube 24 can be fed to the cups. Communication between the bore of the tube 24 and the several cups 26 is maintained by spacing the ports 31 of each cup differently from the spacing between the ports 32 of the associated series in the tube 24, so that at least one port 32 will always be in register with one port 31 of the associated cup during rotary motion of that cup.

Figure 3:
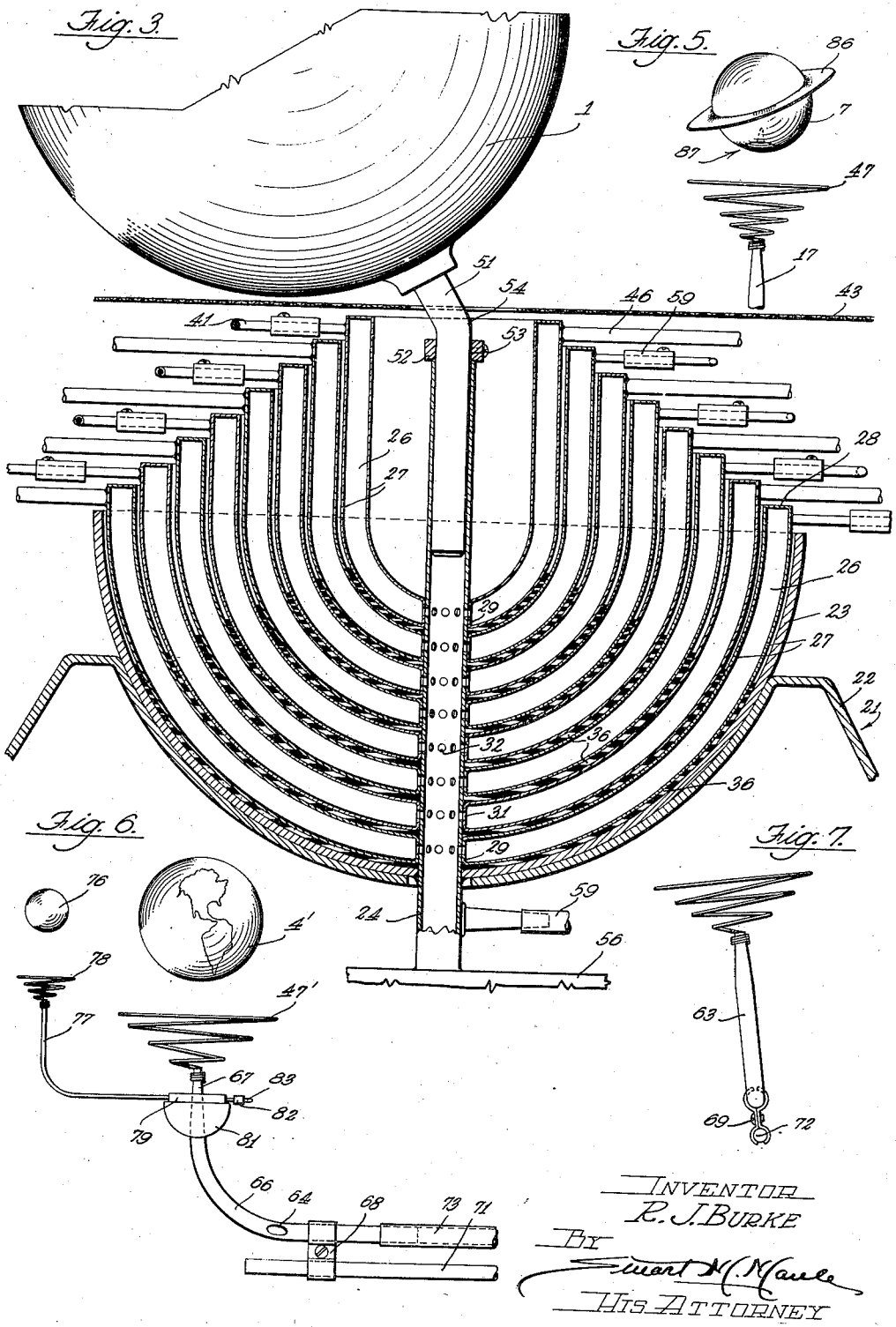
Fig. 3 is an enlarged detail view in transverse, vertical, medial section, taken upon the line 3—3 of Fig. 1 with the direction of view as indicated.

Means are provided for reducing the frictional resistance to rotation of each cup with respect to its neighbors as well as rotation of the lowermost cup with respect to the supporting bowl 23. Fig. 3 illustrates this anti-friction as a film 36 of mercury interposed between the bowl 23 and the lowermost cup 26 as well as between the cups 26 of each adjacent pair thereabove. Owing to the fact that the nested bowls are very similar to each other in shape, a relatively small quantity of mercury will suffice to float the cup 26 thereabove, thereby making it possible for all the cups 26 to rotate with the frictional resistance reduced to a minimum. I have found that the tubular walls 31 of the cups 26 may be proportioned so as to rotate freely upon the tube 24 and still fit sufficiently tightly thereupon to prevent leakage of the mercury 36 through the ports 32 and 31 into the interior of the cups 26.

Fig. 8 shows different methods of minimizing the friction between adjacent cups. For example, instead of employing the mercury, annular washers 37 may be interposed between each two adjacent cups 26', these washers 37 either being affixed directly to the cups themselves or left free to rotate with respect thereto. Another method is to provide a plurality of small steel balls 38 between each two adjacent cups 26'. It is believed, however, that mercury, oil, or the like will be the most advantageous anti-friction means, inasmuch as it will assist materially in sealing the cups 26 against the escape of air between the tubular walls 29 and the tube 24, owing to the high specific gravity of the fluid and the consequent relatively high pressure of the air which would be necessary in order for the air to force bubbles out of the cups 26 and into the fluid in which the cups are floating.

A plurality, preferably three arms 41 radiate from each cup 26, it being understood that each cup 26 extends slightly higher than the adjacent cup 26 therebelow, thereby making it possible for the arms 41 to turn freely without interference with each other. The arms 41 of each cup 26 support an annulus 42 composed preferably of relatively light wire which serves as a support for the outer edge of an annularly shaped sheet 43 of preferably flexible material such as cloth. In order to provide greater spacing between the several sheets 43, I prefer that the arms or spokes 41 of all except the uppermost ring 41 be bent downwards, as clearly shown upon Fig. 2. The wire rings 42 carried by the several cups 26 are of gradually increasing radius and are so arranged that the ring which is carried by the smallest or uppermost cup 26 is the smallest ring and become successively larger to the outermost or largest ring 42 which is carried by the lowermost or largest cup 26.

In one form of my device one of the spokes 41 radiating from each cup 26 is in the form of a tube 46, the bore of which communicates with the interior of the cup 26 with which it is associated. Preferably the tube in each case is bent downwards slightly further than the other spokes 41 of the associated ring 42, so that the outermost end of the tube can be deflected upwards to form a nozzle upon which is carried a pocket member 47 with the upper edge of the pocket member 47 lying substantially flush with the associated sheet 43 of flexible material. Each of the nozzles 48 is adapted to direct its jet vertically upwards and axially through the associated pocket 47; and these jets provide the means for supporting the several bodies 2 to 9 inclusive, it being a well-known principle of mechanics that a sufficiently light body can be supported in midair through the expedient of an upwardly directed jet of air or other gas of sufficient velocity. The pockets 47 serve to catch the respective associated bodies in the event that they move out of proper relationship with the associated jet so as to permit the body to fall; and whenever one of the bodies does fall into the associated pocket 47, the body is guided back into the jet owing to the conical configuration of the pocket and again elevated by the jet into its proper position. I have found by experimentation that if the gas supplied to the several nozzles 48 is maintained at a very even pressure and if the nozzles 48 are all carefully designed so as to produce evenly flowing jets, the bodies will be supported by the jets practically motionless except for the rotation of the bodies around their own axes, with the result that the bodies appear to be supported in space, thereby simulating the actual conditions obtaining in the case of the celestial bodies of which the device is an approximate model. Consequently the device of the prevent invention assists materially in acquiring a realization of the gravitational conditions which actually exist. Moreover, each of the bodies 1-10 inc. is preferably provided with suitable markings or other matter thereon identifying it as a representation if a certain celestial object, such, for example, as the Sun, one of the planets, etc.

Preferably the central body 1 which represents the Sun is supported upon a pin 51 which fits into the upper end of the tube 24 and thereby serves as a plug to prevent escape of air therefrom. The upper end of the tube 24 is preferably provided with a collar 52 having a set screw 53 threaded therethrough whereby the pin 51 may be locked at selected degree of elevation with respect to the tube 24. I also prefer that the pin 51 be offset slightly, as by having a bend 54 formed therein, thereby positioning the body 1 eccentrically with respect to the circular orbits traversed by the several nozzles 48 as they rotate thereabout. The reason for this is that it assists in conveying the impression that the several planets move in elliptical orbits with the Sun situate at one of the foci.

Any suitable gas may be employed to operate the jets issuing from the several nozzles 48. Preferably, however, compressed air is used for this purpose inasmuch as it is available commercially at relatively low prices and in convenient containers such as a pressure tank 56, which may readily be interchanged when empty for a fully charged tank. Preferably the tanks 56 employed are each supplied with a valve 57, whereby escape of the compressed air therefrom can readily be controlled. It is intended that the source of gas under pressure be connected to the lower end of the pipe 24 either directly under the supporting bracket 22 as illustrated on Fig. 2, or at a remote point under which circumstances it probably will be connected to the tube 24 by any suitable flexible conduit from the source of supply.

It should be explained that it is within the contemplation of the present invention to construct the several bodies 1 to 10 inclusive, of any suitable relatively light material such as cork or cotton batting or they may be hollow bodies such as celluloid balls. It is preferred that they be so proportioned as to give some conception of the relative size of the several celestial objects of which they are a simulation, although in view of the great difference in the sizes of celestial objects, it probably will be impracticable in most cases to adhere closely to the exact proportion as far as the actual size of the simulated bodies is concerned. It is, however, quite practicable to convey the impression that one body is much larger than another and to arrange the various bodies in such a manner that the relative sizes of the simulated bodies is properly depicted. Similarly the relative spacing of the several bodies of which the device is a simulation can be indicated without strict adherence to the exact proportion. In this connection it should be explained that the outermost of the several bodies comprising the device illustrated on Figs. 1 to 3, i. e., the body 10 is intended to simulate the most recently discovered planet, Pluto, and inasmuch as this planet is situated at such a tremendous distance from the Sun it is deemed impracticable to mount the nozzle 20 associated therewith in the same manner as the nozzles 11 to 19 inclusive; instead the nozzle 20 is carried by a separate base 58 and is connected to the pipe 24 through the expedient of a flexible conduit 59 of such length that the nozzle 20 can be positioned far enough outside the orbit traversed by the body 9 to yield an impression of the relative position of the planet Pluto.

Inasmuch as each of the wire rings 42 will be weighted more heavily upon one side owing to the presence of the nozzle 48 and the pocket 47 carried thereby and owing also to the reaction of the nozzle which tends to force the nozzle downwards, I prefer that each cup 26 have one or more counterweights 60 associated therewith in such a manner as effectually to counterbalance these forces. These counterweights 60 may either be carried by one or more of the spokes 61 or upon an additional wire or tube 61 projecting from the associated cup 26 directly opposite the tube 46 which leads to the associated nozzle 48.

Means are provided for causing each of the several rings 42 to rotate independently of the others whereby the several bodies 2 to 9 inclusive are caused to move in circular orbits about the body 1. Fig. 4, for example, illustrates the tube 61 upon which the counterweight 69 is mounted as being in communication with the associated cup 26 and having its outer end deflected so as to provide a tangentially extending nozzle 62, the purpose being to rotate the ring 42 by the force of reaction of the jet issuing from the nozzle 62. Another method of rotating each of the several rings 42 is illustrated upon Fig. 7, which illustrates one of the nozzles 63 as being misplaced slightly from the vertical, i. e., the nozzle 63 inclines upwards and toward the rear with respect to the direction in which the associated ring 42 is intended to rotate. In such construction the horizontal component of the reaction force of the jet issuing from the nozzle 63 provides the necessary motive force to cause rotation of the associated ring 42. Fig. 6 illustrates another method of causing each of the rings 42 to rotate, this method being by providing an auxiliary orifice in the after side of the tube 66 leading to the nozzle 67, thereby providing means for directing a jet of air rearwards so that the force of reaction of this jet tends to rotate the associated ring. It should be understood, however, that when the device is intended to simulate a group of celestial objects which are stationary with respect to each other, the means for rotating the rings 42 will either be eliminated or so adjusted as to render it inoperative, and thereby permit the several bodies to remain in substantially fixed position with respect to each other.

It will be observed that in Figs. 6 and 7 the tubes on which the nozzles 67 and 63 respectively are formed are relatively short and are mounted through the expedient of brackets 68 and 69 respectively upon supporting rods or arms 71 and 72 respectively. The purpose of this construction is to avoid the necessity of employing a tube for one of the spokes and making that tube so that its bore communicates with the interior of the associated cup 26. In this construction it is necessary only to connect the tube on which the nozzle 67 or 63 as the case might be, with the interior of the associated cup 26 through the expedient of a suitable conduit 73.

Figure 6 also illustrates another slight modification which makes it possible to provide an auxiliary body 76 associated with one of the main bodies 4' so as to represent a satellite associated with a parent planet. The body 76 is similarly supported upon the jet of the nozzle 77 having a pocket 78 and extending radially outwards from a hollow cup 79 which is rotatably mounted upon the vertical nozzle 67 and supported by a cup 81 which is rigid with the nozzle 67. Anti-friction means such as the ball bearings, mercury or washers hereinabove described should be interposed between the cups 79 and 81. The rotatable cup 79 is preferably provided with a counterweight 82 adjustably mounted upon an arm 83 extending outwards from the cup 79 and diametrically opposite the tube 77. Thus it becomes apparent that the supporting structure for the body 76 is similar to the construction of the cups 26.

In some instances it may be desirable to provide one of the bodies supported upon a jet of air or other gas with means for preventing that body from rotating within the jet upon which it is supported, about any axis other than the vertical. For example the body 7 which simulates the planet Saturn and which is illustrated in enlarged detail upon Fig. 5 if provided with a ring 86 and it therefore is desirable that it be prevented from turning about any but a vertical axis. For this purpose that portion of the body 7 which is desired to remain lowermost is weighted as indicated at 87, the result being that the ring 86 will be maintained in an inclined plane although the entire body 7 including the ring 86 is free to rotate about a vertical axis, while the body 7 is supported in the jet issuing from the associated nozzle 17.

Whereas in the previously described modifications the several bodies are adapted to rotate about the central body independently of each other, it may be desirable under certain circumstances to provide a simplified device wherein all the bodies rotate simultaneously with each in its own independent orbit and with all the orbits arranged concentrically about a parent central body 91. Fig. 9 illustrates such an arrangement wherein a plurality of tubes 92 radiate from a central container 93 which is revolubly mounted upon a spindle 94 to which air or other gas under pressure is supplied from any suitable source such as tank 96. A port 97 in the tube 94 establishes communication between the tank 96 and the interior of the container 93 thereby making it possible to supply gas at suitable pressure to all of the nozzles 98, a plurality of which are preferably provided upon each of the tubes 92. Thus it may be seen that a plurality of upwardly directed jets 99 are provided, each being adapted to support a body 101 while the entire group of bodies rotates about the central body 91. Means are provided for rotating the entire group of bodies, this being easily accomplished through the expedient of a small turbine wheel 102 carried by a vertical shaft 103 which is journaled in a bracket 104 carried by the container 93. A nozzle 106 extending from the container 93 is adapted to direct its jet tangentially against the turbine wheel 102 and thereby effect rotation of a gear 107 which is affixed to the lower end of the shaft 103. This gear 107 is enmeshed with a large stationary gear 108 which is rigidly mounted upon a bracket 109 upon which the tube 94 is supported.

In this modification a central body 91 about which the other bodies 101 revolve is itself supported upon a jet 111 instead of being supported upon some rigid means as in the previously described modification. This jet 111 issues from a nozzle 112 which is formed at the upper end of the pipe 94; and a socket or cup 113 is provided upon the nozzle 112 in position to catch the body 91 should it become misplaced from the jet 111 or when air under pressure is no longer supplied to the nozzle 112. Similarly each of the nozzles 98 is also provided with a suitable cup 114 adapted to catch the associated body 101 and hold it axially of the associated nozzle 98 so that the body 91 is retained in proper position to be elevated again by the jet 99.

A suitable cover 116 preferably is provided, this cover being supported upon the upper peripheries of the cups or sockets 113 and 114, suitable openings 117 being formed in the cover 116 in registry with each of the cups so as to permit the jets 111 and 99 to pass therethrough. This cover 116 serves effectually to conceal all the working parts of the device leaving only the bodies 91 and 101 exposed to view. The importance of this detail is two-fold: first, it conceals all the mechanical details of the device which might otherwise tend to distract a person studying the movements and relative positions and sizes of the bodies 91 and 101, and second, it provides a surface upon which suitable descriptive matter and/or illustrations may be imprinted or otherwise marked, setting forth data descriptive of the celestial objects of which the bodies 91 and 101 are models. Preferably the peripheral edge of the cover 116 is draped so as to hang down closely adjacent to the surface upon which the bracket 109 rests.

In the same manner I prefer that the peripheral edges 121 of the annular sheets 43 of material carried by the rings 42 in the first described modification, be draped so as to hang downwards to positions closely adjacent to the sheet 43 therebelow, whereas the peripheral edge 122 of the lowest and outermost sheet 43 is draped so as to hang downwards to a position closely adjacent to the surface upon which the entire device is supported thereby concealing all the mechanical features of the device. Moreover the upper surfaces of the sheets 43 provide ample space for the accommodation of a relatively large amount of descriptive matter 126 and/or illustrations 127 pertaining to the particular group of celestial objects which are simulated and the individual members comprising that group. In this manner it is possible to overcome the disadvantages presented by the limitations of the device with respect to proportion in distance and size, inasmuch as such discrepancies can be explained and compensated for by the descriptive matter.

I claim:

1. In a device of the character described, a plurality of supporting members revolubly mounted for rotation about a common axis, an arm extending from each of said supporting members, a nozzle carried by each of said arms and adapted to direct its jet upwards, a body adapted to be supported in each of said jets, means on each of said bodies identifying it as a representation of a celestial object, and means for supplying said nozzles with gas under pressure.

2. In a device of the character described, a plurality of cups disposed in nested relation and mounted for rotation about a common axis, an arm extending from each of said cups, a nozzle carried by each of said arms and adapted to direct its jet upwards, a body adapted to be supported in each of said jets and simulating a celestial object, and means for supplying said nozzles with gas under pressure.

3. In a device of the character described, a plurality of cups disposed in nested relation and mounted for independent rotation about a common axis, anti-friction means interposed between each two adjacent cups, an arm extending from each of said cups, a nozzle carried by each of said arms and adapted to direct its jet upwards, a body adapted to be supported in each of said jets and simulating a celestial object, and means for supplying said nozzles with gas under pressure.

4. In a device of the character described, a plurality of cups disposed in nested relation and mounted for independent rotation about a common axis, mercury interposed between each two adjacent cups and floating the uppermost of the associated two cups therein, an arm extending from each of said cups, a nozzle carried by each of said arms and adapted to direct its jet upwards, a body adapted to be supported in each of said jets and simulating a celestial object, and means for supplying said nozzles with gas under pressure.

5. In a device of the character described, a plurality of cups disposed in nested relation and mounted for rotation about a common axis, each of said cups being of hollow construction, a tubular arm extending from each of said cups and communicating with the interior thereof, a nozzle on each of said arms adapted to direct its jet upwards, a body adapted to be supported on each of said jets and simulating a celestial object, and means for supplying gas under pressure to the interior of said cups.

6. In a device of the character described, a tubular supporting member, a plurality of cups disposed in nested relation and revolubly mounted on said supporting member, each of said cups being of hollow construction, a tubular arm extending from each of said cups and communicating with the interior thereof, a nozzle on each of said arms adapted to direct its jet upwards, a body adapted to be supported in each of said jets and simulating a celestial object, and means for supplying gas under pressure to said supporting member.

7. In a device of the character described, a tubular supporting member, a plurality of cups disposed in nested relation and revolubly mounted on said supporting member, anti-friction means interposed between each two adjacent cups, each of said cups being of hollow construction, a tubular arm extending from each of said cups and communicating with the interior thereof, a nozzle on each of said arms adapted to direct its jet upwards, a body adapted to be supported in each of said jets and simulating a celestial object, and means for supplying gas under pressure to said supporting member.

8. In a device of the character described, a tubular supporting member, a plurality of cups disposed in nested relation and revolubly mounted on said supporting member, mercury interposed between each two adjacent cups and floating the uppermost of the associated two cups therein, each of said cups being of hollow construction, a tubular arm extending from each of said cups and communicating with the interior thereof, a nozzle on each of said arms adapted to direct its jet upwards, a body adapted to be supported in each of said jets and simulating a celestial object, and means for supplying gas under pressure to said supporting member.

9. In a device of the character described, a plurality of cups disposed in nested relation and mounted for rotation about a common axis, each of said cups being of hollow construction, a tubular arm extending from each of said cups and communicating with the interior thereof, a nozzle on each of said arms adapted to direct its jet upwards, a body adapted to be supported in each of said jets and simulating a celestial object, means for rotating said cups to propel said nozzles in circular orbits, and means for supplying gas under pressure to the interior of said cups.

10. In a device of the character described, a plurality of cups disposed in nested relation and mounted for rotation about a common axis, each of said cups being of hollow construction, a tubular arm extending from each of said cups and communicating with the interior thereof, a nozzle on each of said arms adapted to direct its jet upwards, a body adapted to be supported in each of said jets and simulating a celestial object, means for rotating each of said cups to propel said nozzles in circular orbits independently of each other, and means for supplying gas under pressure to the interior of said cups.

11. In a device of the character described, a tubular supporting member, a plurality of cups disposed in nested relation and revolubly mounted on said supporting member, each of said cups being of hollow construction, a tubular arm extending from each of said cups and communicating with the interior thereof, a nozzle on each of said arms adapted to direct its jet upwards, a body adapted to be supported in each of said jets and simulating a celestial object, means for supplying gas under pressure to said supporting member, and means establishing a seal between said supporting member and each of said cups to prevent leakage of said gas therebetween.

12. In a device of the character described, a plurality of bodies simulating celestial objects, movable fluid-discharging means associated with each of said bodies and adapted to direct their jets upwards, said bodies being supported in said jets, means guiding said fluid-discharging means in predetermined orbits, and means supplying fluid to said fluid-discharging means.

13. In a device of the character described, a plurality of bodies simulating celestial objects, movable fluid-discharging means associated with each of said bodies and adapted to direct their jets upwards, said bodies being supported in said jets, means guiding said fluid-discharging means in substantially concentric orbits, and means supplying fluid to said fluid-discharging means.

14. In a device of the character described, a plurality of bodies simulating celestial objects, movable fluid-discharging means associated with each of said bodies and adapted to direct their jets upwards, said bodies being supported in said jets, means guiding each of said fluid-discharging means independently of the others and in a predetermined path, and means supplying fluid to said fluid-discharging means.

15. In a device of the character described, a plurality of bodies simulating celestial objects, movable fluid-discharging means associated with each of said bodies and adapted to direct their jets upwards, said bodies being supported in said jets, means guiding said fluid-discharging means independently of each other and in substantially concentric orbits, and means supplying fluid to said fluid-discharging means.

16. In a device of the character described, a plurality of bodies simulating celestial objects, movable fluid-discharging means associated with each of said bodies and adapted to direct their jets upwards, said bodies being supported in said jets, means guiding each of said fluid-discharging means in its respective orbit, and means supplying fluid to said fluid-discharging means.

17. In a device of the character described, a plurality of bodies simulating celestial objects, movable fluid-discharging means associated with each of said bodies and adapted to direct their jets upwards, said bodies being supported in said jets, means guiding each of said fluid-discharging means in a predetermined orbit, means for propelling said fluid-discharging means in their respective orbits, and means supplying said fluid-discharging means with fluid under pressure.

18. In a device of the character described, a plurality of bodies simulating celestial objects, movable fluid-discharging means associated with each of said bodies and adapted to direct their jets upwards, said bodies being supported in said jets, means guiding each of said fluid-discharging means independently of the others and in a predetermined orbit, means for propelling said fluid-discharging means in their respective orbits, and means supplying said fluid-discharging means with fluid under pressure.

19. In a device of the character described, fluid-discharging means adapted to direct a jet upwards, means supplying said fluid-discharging means with fluid under pressure, a body simulating a celestial object and adapted to be supported in said jet, and means supplying additional weight at one side of said body to hold that side down.

20. In a display device, a plurality of spheres, a support having a vertical member and a horizontal member including sphere holding means, at least one perpendicularly and at least one angularly dispose jet nozzle singly secured beneath said sphere holding means, and a source of fluid pressure supply for emitting streams of fluid from said jet nozzles to raise from said holding means and aerodynamically sustain at least one and sustain and rotate at least another of said spheres in mid-air.

21. In a device of the character described, a plurality of bodies simulating a heavenly group, movable fluid-discharging means associated with each of said bodies for supporting the same in the respective jets thereof, said fluid-discharging means being adapted to direct the jets upwardly in such a manner as to maintain said bodies in predetermined orbits, and means supplying fluid to said fluid-discharging means.

22. In a device of the character described, a plurality of bodies simulating a heavenly group, movable fluid-discharging means associated with each of said bodies for supporting the same in the respective jets thereof, said fluid-discharging means being adapted to direct the jets upwardly in such a manner as to maintain said bodies in space, means for controlling each of said fluid-discharging means independently of each other for obtaining predetermined orbits for said bodies and means supplying fluid to said fluid-discharging means.

RICHARD J. BURKE.